US007562431B2

(12) United States Patent
Lewark

(10) Patent No.: US 7,562,431 B2
(45) Date of Patent: Jul. 21, 2009

(54) METHOD FOR BRINGING IN A STRIP FORMING A SPRING OF A BOARD

(75) Inventor: Matthias Lewark, Kremmen (DE)

(73) Assignee: Flooring Technologies Ltd., Pieta, Malta ( * ) Notice: Subject to any disclaimer, the term of this patent is extended or adjusted under 35 U.S.C. 154(b) by 809 days.

(21) Appl. No.: 11/036,177

(22) Filed: Jan. 18, 2005

(65) Prior Publication Data

US 2005/0205161 A1 Sep. 22, 2005

(30) Foreign Application Priority Data

Jan. 30, 2004 (DE) ....................... 10 2004 005 047

(51) Int. Cl.
*B23P 11/02* (2006.01)

(52) U.S. Cl. .............................. 29/451; 29/789; 29/238

(58) Field of Classification Search ................... 29/238, 29/253, 451, 789, 797, 467, 786, 824, 787
See application file for complete search history.

(56) References Cited

U.S. PATENT DOCUMENTS

| | | | |
|---|---|---|---|
| 213,740 | A | 4/1879 | Conner |
| 623,562 | A | 4/1899 | Rider |
| 714,987 | A | 12/1902 | Wolfe |
| 753,791 | A | 3/1904 | Fulghum |
| 1,124,228 | A | 1/1915 | Houston |
| 1,407,679 | A | 2/1922 | Ruthrauff |
| 1,454,250 | A | 5/1923 | Parsons |
| 1,468,288 | A | 9/1923 | Een |
| 1,477,813 | A | 12/1923 | Daniels |
| 1,510,924 | A | 10/1924 | Daniels et al. |

(Continued)

FOREIGN PATENT DOCUMENTS

| | | |
|---|---|---|
| AT | 005566 | 8/2002 |

(Continued)

OTHER PUBLICATIONS

European Search Report; Ref. No. 2459-191 EP-1; Applicant : Kronotec AG; dated May 6, 2005.

(Continued)

*Primary Examiner*—David P Bryant
*Assistant Examiner*—Christopher M Koehler
(74) *Attorney, Agent, or Firm*—Greenblum & Bernstein P.L.C.

(57) ABSTRACT

A method for placing a locking element that forms the spring of a board that is provided with a spring/groove profiling, in particular, a floor panel, in a first groove that is present on one of the lateral edges of the board, where the locking element displays locking means with whose help two boards, connected via the spring/groove, can be locked together laterally with respect to the direction of connection. The method includes transporting the board and locking element at the same speed parallel to each other along a transport distance in a transport direction (T). During the transport, the locking element runs laterally along a fixed device that constantly narrows the transport distance in the direction of transport (T). By means of the device, the locking element is constantly and increasingly shifted laterally with respect to the direction of transport (T) until in the process. Starting with its front end with respect to the direction of transport (T), it is pressed into groove of board in a steadily increasing manner.

20 Claims, 2 Drawing Sheets

U.S. PATENT DOCUMENTS

| | | | |
|---|---|---|---|
| 1,540,128 | A | 6/1925 | Houston |
| 1,575,821 | A | 3/1926 | Daniels |
| 1,602,256 | A | 10/1926 | Sellin |
| 1,602,267 | A | 10/1926 | Karwisch |
| 1,615,096 | A | 1/1927 | Meyers |
| 1,622,103 | A | 3/1927 | Fulton |
| 1,622,104 | A | 3/1927 | Fulton |
| 1,637,634 | A | 8/1927 | Carter |
| 1,644,710 | A | 10/1927 | Crooks |
| 1,660,480 | A | 2/1928 | Daniels |
| 1,714,738 | A | 5/1929 | Smith |
| 1,718,702 | A | 6/1929 | Pfiester |
| 1,734,826 | A | 11/1929 | Pick |
| 1,764,331 | A | 6/1930 | Moratz |
| 1,776,188 | A | 9/1930 | Langb'aum |
| 1,778,069 | A | 10/1930 | Fetz |
| 1,779,729 | A | 10/1930 | Bruce |
| 1,787,027 | A | 12/1930 | Wasleff |
| 1,823,039 | A | 9/1931 | Gruner |
| 1,859,667 | A | 5/1932 | Gruner |
| 1,898,364 | A | 2/1933 | Gynn |
| 1,906,411 | A | 5/1933 | Potvin |
| 1,921,164 | A | 8/1933 | Lewis |
| 1,929,871 | A | 10/1933 | Jones |
| 1,940,377 | A | 12/1933 | Storm |
| 1,946,648 | A | 2/1934 | Taylor |
| 1,953,306 | A | 4/1934 | Moratz |
| 1,986,739 | A | 1/1935 | Mitte |
| 1,988,201 | A | 1/1935 | Hall |
| 2,023,066 | A | 12/1935 | Curtis et al. |
| 2,044,216 | A | 6/1936 | Klages |
| 2,065,525 | A | 12/1936 | Hamilton |
| 2,123,409 | A | 7/1938 | Elmendorf |
| 2,220,606 | A | 11/1940 | Malarkey et al. |
| 2,276,071 | A | 3/1942 | Scull |
| 2,280,071 | A | 4/1942 | Hamilton |
| 2,324,628 | A | 7/1943 | Kähr |
| 2,328,051 | A | 8/1943 | Bull |
| 2,398,632 | A | 4/1946 | Frost et al. |
| 2,430,200 | A | 11/1947 | Wilson |
| 2,740,167 | A | 4/1956 | Rowley |
| 2,894,292 | A | 7/1959 | Gramelspacker |
| 3,045,294 | A | 7/1962 | Livezey, Jr. |
| 3,100,556 | A | 8/1963 | De Ridder |
| 3,125,138 | A | 3/1964 | Bolenbach |
| 3,182,769 | A | 5/1965 | De Ridder |
| 3,203,149 | A | 8/1965 | Soddy |
| 3,204,380 | A | 9/1965 | Smith et al. |
| 3,267,630 | A | 8/1966 | Omholt |
| 3,282,010 | A | 11/1966 | King, Jr. |
| 3,310,919 | A | 3/1967 | Bue et al. |
| 3,347,048 | A | 10/1967 | Brown et al. |
| 3,460,304 | A | 8/1969 | Braeuninger et al. |
| 3,481,810 | A | 12/1969 | Waite |
| 3,526,420 | A | 9/1970 | Brancaleone |
| 3,538,665 | A | 11/1970 | Gohner |
| 3,553,919 | A | 1/1971 | Omholt |
| 3,555,762 | A | 1/1971 | Costanzo, Jr. |
| 3,608,258 | A | 9/1971 | Spratt |
| 3,694,983 | A | 10/1972 | Couquet |
| 3,714,747 | A | 2/1973 | Curran |
| 3,720,027 | A | 3/1973 | Christensen |
| 3,731,445 | A | 5/1973 | Hoffmann et al. |
| 3,759,007 | A | 9/1973 | Thiele |
| 3,760,548 | A | 9/1973 | Sauer et al. |
| 3,768,846 | A | 10/1973 | Hensley et al. |
| 3,859,000 | A | 1/1975 | Webster |
| 3,878,030 | A | 4/1975 | Cook |
| 3,902,293 | A | 9/1975 | Witt et al. |
| 3,908,053 | A | 9/1975 | Hettich |
| 3,936,551 | A | 2/1976 | Elmendorf et al. |
| 3,988,187 | A | 10/1976 | Witt et al. |
| 4,006,048 | A | 2/1977 | Cannady, Jr. et al. |
| 4,090,295 | A * | 5/1978 | Renbarger .................. 29/789 |
| 4,090,338 | A | 5/1978 | Bourgade |
| 4,091,136 | A | 5/1978 | O'Brian et al. |
| 4,099,358 | A | 7/1978 | Compaan |
| 4,118,533 | A | 10/1978 | Hipchen et al. |
| 4,131,705 | A | 12/1978 | Kubinsky |
| 4,164,832 | A | 8/1979 | Van Zandt |
| 4,169,688 | A | 10/1979 | Toshio |
| 4,242,390 | A | 12/1980 | Nemeth |
| 4,243,716 | A | 1/1981 | Kosaka et al. |
| 4,245,689 | A | 1/1981 | Grard et al. |
| 4,246,310 | A | 1/1981 | Hunt et al. |
| 4,290,248 | A | 9/1981 | Kemerer et al. |
| 4,299,070 | A | 11/1981 | Oltmanns et al. |
| 4,426,820 | A | 1/1984 | Terbrack et al. |
| 4,431,044 | A | 2/1984 | Bruneau |
| 4,471,012 | A | 9/1984 | Maxwell |
| 4,501,102 | A | 2/1985 | Knowles |
| 4,561,233 | A | 12/1985 | Harter et al. |
| 4,585,685 | A | 4/1986 | Forry et al. |
| 4,612,745 | A | 9/1986 | Hovde |
| 4,641,469 | A | 2/1987 | Wood |
| 4,653,242 | A | 3/1987 | Ezard |
| 4,654,244 | A | 3/1987 | Eckert et al. |
| 4,703,597 | A | 11/1987 | Eggemar |
| 4,715,162 | A | 12/1987 | Brightwell |
| 4,738,071 | A | 4/1988 | Ezard |
| 4,752,497 | A | 6/1988 | McConkey et al. |
| 4,769,963 | A | 9/1988 | Meyerson |
| 4,819,932 | A | 4/1989 | Trotter, Jr. |
| 4,831,806 | A | 5/1989 | Niese et al. |
| 4,845,907 | A | 7/1989 | Meek |
| 4,905,442 | A | 3/1990 | Daniels |
| 4,947,602 | A | 8/1990 | Pollasky |
| 5,029,425 | A | 7/1991 | Bogataj |
| 5,103,614 | A | 4/1992 | Kawaguchi et al. |
| 5,113,632 | A | 5/1992 | Hanson |
| 5,117,603 | A | 6/1992 | Weintraub |
| 5,136,823 | A | 8/1992 | Pellegrino |
| 5,165,816 | A | 11/1992 | Parasin |
| 5,179,812 | A | 1/1993 | Itill |
| 5,205,091 | A | 4/1993 | Brown |
| 5,216,861 | A | 6/1993 | Meyerson |
| 5,251,996 | A | 10/1993 | Hiller et al. |
| 5,253,464 | A | 10/1993 | Nilsen |
| 5,283,102 | A | 2/1994 | Sweet et al. |
| 5,295,341 | A | 3/1994 | Kajiwara |
| 5,335,473 | A | 8/1994 | Chase |
| 5,348,778 | A | 9/1994 | Knipp et al. |
| 5,349,796 | A | 9/1994 | Meyerson |
| 5,390,457 | A | 2/1995 | Sjölander |
| 5,413,834 | A | 5/1995 | Hunter et al. |
| 5,433,806 | A | 7/1995 | Pasquali et al. |
| 5,474,831 | A | 12/1995 | Nystrom |
| 5,497,589 | A | 3/1996 | Porter |
| 5,502,939 | A | 4/1996 | Zadok et al. |
| 5,540,025 | A | 7/1996 | Takehara et al. |
| 5,567,497 | A | 10/1996 | Zegler et al. |
| 5,570,554 | A | 11/1996 | Searer |
| 5,597,024 | A | 1/1997 | Bolyard et al. |
| 5,630,304 | A | 5/1997 | Austin |
| 5,653,099 | A | 8/1997 | MacKenzie |
| 5,671,575 | A | 9/1997 | Wu |
| 5,694,734 | A | 12/1997 | Cercone et al. |
| 5,706,621 | A | 1/1998 | Pervan |
| 5,736,227 | A | 4/1998 | Sweet et al. |
| 5,768,850 | A | 6/1998 | Chen |
| 5,797,175 | A | 8/1998 | Schneider |
| 5,797,237 | A | 8/1998 | Finkell, Jr. |
| 5,823,240 | A | 10/1998 | Bolyard et al. |
| 5,827,592 | A | 10/1998 | Van Gulik et al. |

| | | | |
|---|---|---|---|
| 5,860,267 | A | 1/1999 | Pervan |
| 5,935,668 | A | 8/1999 | Smith |
| 5,943,239 | A | 8/1999 | Shamblin et al. |
| 5,953,878 | A | 9/1999 | Johnson |
| 5,968,625 | A | 10/1999 | Hudson |
| 5,985,397 | A | 11/1999 | Witt et al. |
| 5,987,839 | A | 11/1999 | Hamar et al. |
| 6,006,486 | A | 12/1999 | Moriau et al. |
| 6,023,907 | A | 2/2000 | Pervan |
| 6,065,262 | A | 5/2000 | Motta |
| 6,094,882 | A | 8/2000 | Pervan |
| 6,101,778 | A | 8/2000 | Martensson |
| 6,119,423 | A | 9/2000 | Costantino |
| 6,134,854 | A | 10/2000 | Stanchfield |
| 6,148,884 | A | 11/2000 | Bolyard et al. |
| 6,168,866 | B1 | 1/2001 | Clark |
| 6,182,410 | B1 | 2/2001 | Pervan |
| 6,186,703 | B1 | 2/2001 | Shaw |
| 6,205,639 | B1 | 3/2001 | Pervan |
| 6,209,278 | B1 | 4/2001 | Tychsen |
| 6,216,403 | B1 | 4/2001 | Belbeoc'h |
| 6,216,409 | B1 | 4/2001 | Roy et al. |
| D442,296 | S | 5/2001 | Külik |
| D442,297 | S | 5/2001 | Külik |
| D442,298 | S | 5/2001 | Külik |
| D442,706 | S | 5/2001 | Külik |
| D442,707 | S | 5/2001 | Külik |
| 6,224,698 | B1 | 5/2001 | Endo |
| 6,238,798 | B1 | 5/2001 | Kang et al. |
| 6,247,285 | B1 | 6/2001 | Moebus |
| D449,119 | S | 10/2001 | Külik |
| D449,391 | S | 10/2001 | Külik |
| D449,392 | S | 10/2001 | Külik |
| 6,324,803 | B1 | 12/2001 | Pervan |
| 6,345,481 | B1 | 2/2002 | Nelson |
| 6,363,677 | B1 | 4/2002 | Chen et al. |
| 6,397,547 | B1 | 6/2002 | Martensson |
| 6,418,683 | B1 | 7/2002 | Martensson et al. |
| 6,421,970 | B1 | 7/2002 | Martensson et al. |
| 6,427,408 | B1 | 8/2002 | Krieger |
| 6,436,159 | B1 | 8/2002 | Safta et al. |
| 6,438,919 | B1 | 8/2002 | Knauseder |
| 6,446,405 | B1 | 9/2002 | Pervan |
| 6,449,913 | B1 | 9/2002 | Shelton |
| 6,449,918 | B1 | 9/2002 | Nelson |
| 6,453,632 | B1 | 9/2002 | Huang |
| 6,458,232 | B1 | 10/2002 | Valentinsson |
| 6,460,306 | B1 | 10/2002 | Nelson |
| 6,461,636 | B1 | 10/2002 | Arth et al. |
| 6,465,046 | B1 | 10/2002 | Hansson et al. |
| 6,490,836 | B1 | 12/2002 | Moriau et al. |
| 6,497,961 | B2 | 12/2002 | Kang et al. |
| 6,510,665 | B2 | 1/2003 | Pervan |
| 6,516,579 | B1 | 2/2003 | Pervan |
| 6,517,935 | B1 | 2/2003 | Kornfalt et al. |
| 6,519,912 | B1 | 2/2003 | Eckmann et al. |
| 6,521,314 | B2 | 2/2003 | Tychsen |
| 6,532,709 | B2 | 3/2003 | Pervan |
| 6,533,855 | B1 | 3/2003 | Gaynor et al. |
| 6,536,178 | B1 | 3/2003 | Pålson et al. |
| 6,546,691 | B2 | 4/2003 | Peopolder |
| 6,553,724 | B1 | 4/2003 | Bigler |
| 6,558,754 | B1 | 5/2003 | Velin et al. |
| 6,565,919 | B1 | 5/2003 | Hansson et al. |
| 6,569,272 | B2 | 5/2003 | Tychsen |
| 6,588,166 | B2 | 7/2003 | Martensson et al. |
| 6,591,568 | B1 | 7/2003 | Palsson |
| 6,601,359 | B2 | 8/2003 | Olofsson |
| 6,606,834 | B2 | 8/2003 | Martensson et al. |
| 6,617,009 | B1 | 9/2003 | Chen et al. |
| 6,635,174 | B1 | 10/2003 | Berg et al. |
| 6,641,629 | B2 | 11/2003 | Safta et al. |
| 6,646,088 | B2 | 11/2003 | Fan et al. |
| 6,647,690 | B1 | 11/2003 | Martensson |
| 6,649,687 | B1 | 11/2003 | Gheewala et al. |
| 6,659,097 | B1 | 12/2003 | Houston |
| 6,672,030 | B2 | 1/2004 | Schulte |
| 6,681,820 | B2 | 1/2004 | Olofsson |
| 6,682,254 | B1 | 1/2004 | Olofsson et al. |
| 6,685,993 | B1 | 2/2004 | Hansson et al. |
| 6,711,864 | B2 | 3/2004 | Erwin |
| 6,711,869 | B2 | 3/2004 | Tychsen |
| 6,715,253 | B2 | 4/2004 | Pervan |
| 6,723,438 | B2 | 4/2004 | Chang et al. |
| 6,729,091 | B1 | 5/2004 | Martensson |
| 6,745,534 | B2 | 6/2004 | Kornfalt |
| 6,761,008 | B2 | 7/2004 | Chen et al. |
| 6,761,794 | B2 | 7/2004 | Mott et al. |
| 6,763,643 | B1 | 7/2004 | Martensson |
| 6,766,622 | B1 | 7/2004 | Thiers |
| 6,769,217 | B2 | 8/2004 | Nelson |
| 6,769,218 | B2 | 8/2004 | Pervan |
| 6,769,835 | B2 | 8/2004 | Stridsman |
| 6,772,568 | B2 | 8/2004 | Thiers et al. |
| 6,775,545 | B2 | 8/2004 | Wright et al. |
| 6,786,019 | B2 | 9/2004 | Thiers |
| 6,803,109 | B2 | 10/2004 | Qiu et al. |
| 6,805,951 | B2 | 10/2004 | Kornfält et al. |
| 6,823,638 | B2 | 11/2004 | Stanchfield |
| 6,841,023 | B2 | 1/2005 | Mott |
| 2001/0029720 | A1 | 10/2001 | Pervan |
| 2001/0034992 | A1 | 11/2001 | Pletzer et al. |
| 2002/0007608 | A1 | 1/2002 | Pervan |
| 2002/0007609 | A1 | 1/2002 | Pervan |
| 2002/0014047 | A1 | 2/2002 | Thiers |
| 2002/0020127 | A1 | 2/2002 | Thiers et al. |
| 2002/0046528 | A1 | 4/2002 | Pervan et al. |
| 2002/0056245 | A1 | 5/2002 | Thiers |
| 2002/0106439 | A1 | 8/2002 | Cappelle |
| 2002/0160680 | A1 | 10/2002 | Laurence et al. |
| 2003/0024200 | A1 | 2/2003 | Moriau et al. |
| 2003/0024201 | A1 | 2/2003 | Moriau et al. |
| 2003/0029115 | A1 | 2/2003 | Moriau et al. |
| 2003/0029116 | A1 | 2/2003 | Moriau et al. |
| 2003/0029117 | A1 | 2/2003 | Moriau et al. |
| 2003/0033777 | A1 | 2/2003 | Thiers et al. |
| 2003/0033784 | A1 | 2/2003 | Pervan |
| 2003/0115812 | A1 | 6/2003 | Pervan |
| 2003/0115821 | A1 | 6/2003 | Pervan |
| 2003/0159385 | A1 | 8/2003 | Thiers |
| 2003/0167717 | A1 | 9/2003 | Garcia |
| 2003/0196405 | A1 | 10/2003 | Pervan |
| 2003/0205013 | A1 | 11/2003 | Garcia |
| 2003/0233809 | A1 | 12/2003 | Pervan |
| 2004/0016196 | A1 | 1/2004 | Pervan |
| 2004/0035078 | A1 | 2/2004 | Pervan |
| 2004/0092006 | A1 | 5/2004 | Lindekens et al. |
| 2004/0105994 | A1 | 6/2004 | Lu et al. |
| 2004/0139678 | A1 | 7/2004 | Pervan |
| 2004/0159066 | A1 | 8/2004 | Thiers et al. |
| 2004/0177584 | A1 | 9/2004 | Pervan |
| 2004/0200165 | A1 | 10/2004 | Garcia et al. |
| 2004/0206036 | A1 | 10/2004 | Pervan |
| 2004/0237447 | A1 | 12/2004 | Thiers et al. |
| 2004/0237448 | A1 | 12/2004 | Thiers et al. |
| 2004/0241374 | A1 | 12/2004 | Thiers et al. |
| 2004/0244322 | A1 | 12/2004 | Thiers et al. |
| 2004/0250493 | A1 | 12/2004 | Thiers et al. |
| 2004/0255541 | A1 | 12/2004 | Thiers et al. |
| 2004/0258907 | A1 | 12/2004 | Kornfalt et al. |
| 2005/0003149 | A1 | 1/2005 | Kornfalt et al. |
| 2005/0016099 | A1 | 1/2005 | Thiers |

FOREIGN PATENT DOCUMENTS

| | | |
|---|---|---|
| AU | 713628 | 5/1998 |

| | | |
|---|---|---|
| AU | 200020703 | 1/2000 |
| BE | 417526 | 9/1936 |
| BE | 557844 | 6/1957 |
| BE | 557844 | 3/1960 |
| BE | 09600527 | 6/1998 |
| BE | 09700344 | 10/1998 |
| CA | 991373 | 6/1976 |
| CA | 2226286 | 12/1997 |
| CA | 2252791 | 5/1999 |
| CA | 2289309 | 7/2000 |
| CH | 24980 | 3/1903 |
| CH | 200949 | 1/1939 |
| CH | 211877 | 1/1941 |
| CH | 562377 | 5/1975 |
| DE | 10034409 | 1/1902 |
| DE | 142293 | 7/1902 |
| DE | 314207 | 9/1919 |
| DE | 531989 | 8/1931 |
| DE | 740235 | 10/1943 |
| DE | 1089966 | 9/1960 |
| DE | 1534278 | 2/1966 |
| DE | 1212225 | 3/1966 |
| DE | 1212275 | 3/1966 |
| DE | 1534802 | 4/1970 |
| DE | 7102476 | 6/1971 |
| DE | 2007129 | 9/1971 |
| DE | 1534278 | 11/1971 |
| DE | 2252643 | 10/1972 |
| DE | 2238660 | 2/1974 |
| DE | 7402354 | 5/1974 |
| DE | 2502992 | 7/1976 |
| DE | 2616077 | 10/1977 |
| DE | 2917025 | 11/1980 |
| DE | 7911924 | 3/1981 |
| DE | 7928703 | 5/1981 |
| DE | 3041781 | 6/1982 |
| DE | 3214207 | 11/1982 |
| DE | 8226153 | 1/1983 |
| DE | 3343601 | 6/1985 |
| DE | 86040049 | 6/1986 |
| DE | 3512204 | 10/1986 |
| DE | 3246376 | 2/1987 |
| DE | 4004891 | 9/1990 |
| DE | 4002547 | 8/1991 |
| DE | 4134452 | 4/1993 |
| DE | 4215273 | 11/1993 |
| DE | 4242530 | 6/1994 |
| DE | 4011656 | 1/1995 |
| DE | 4324137 | 1/1995 |
| DE | 4107151 | 2/1995 |
| DE | 29517128 | 2/1996 |
| DE | 4242530 | 9/1996 |
| DE | 3544845 | 12/1996 |
| DE | 29710175 | 9/1997 |
| DE | 19616510 | 3/1998 |
| DE | 19651149 | 6/1998 |
| DE | 19709641 | 9/1998 |
| DE | 19718319 | 11/1998 |
| DE | 19735189 | 6/2000 |
| DE | 20001225 | 8/2000 |
| DE | 19925248 | 12/2000 |
| DE | 20017461 | 3/2001 |
| DE | 20018284 | 3/2001 |
| DE | 20206460 | 8/2002 |
| DE | 20218331 | 5/2004 |
| EP | 0248127 | 12/1987 |
| EP | 0623724 | 11/1994 |
| EP | 0652340 | 5/1995 |
| EP | 0667936 | 8/1995 |
| EP | 0690185 | 1/1996 |
| EP | 0849416 | 6/1998 |
| EP | 0698162 | 9/1998 |
| EP | 0903451 | 3/1999 |
| EP | 0855482 | 12/1999 |
| EP | 0877130 | 1/2000 |
| EP | 0969163 | 1/2000 |
| EP | 0969164 | 1/2000 |
| EP | 0974713 | 1/2000 |
| EP | 0843763 | 10/2000 |
| EP | 1200690 | 5/2002 |
| EP | 0958441 | 7/2003 |
| EP | 1026341 | 8/2003 |
| ES | 163421 | 9/1968 |
| ES | 460194 | 5/1978 |
| ES | 283331 | 5/1985 |
| ES | 1019585 | 12/1991 |
| ES | 1019585 | 1/1992 |
| ES | 2168045 | 5/2002 |
| FI | 843060 | 8/1984 |
| FR | 1293043 | 4/1962 |
| FR | 2691491 | 11/1983 |
| FR | 2568295 | 5/1986 |
| FR | 2623544 | 5/1989 |
| FR | 2630149 | 10/1989 |
| FR | 2637932 | 4/1990 |
| FR | 2675174 | 10/1991 |
| FR | 2667639 | 4/1992 |
| FR | 2691491 | 11/1993 |
| FR | 2697275 | 4/1994 |
| FR | 2712329 | 5/1995 |
| FR | 2776956 | 10/1999 |
| FR | 2781513 | 1/2000 |
| FR | 2785633 | 5/2000 |
| GB | 424057 | 2/1935 |
| GB | 585205 | 1/1947 |
| GB | 599793 | 3/1948 |
| GB | 636423 | 4/1950 |
| GB | 812671 | 4/1959 |
| GB | 1033866 | 6/1966 |
| GB | 1034117 | 6/1966 |
| GB | 1044846 | 10/1966 |
| GB | 1237744 | 6/1968 |
| GB | 1127915 | 9/1968 |
| GB | 1275511 | 5/1972 |
| GB | 1399402 | 7/1975 |
| GB | 1430423 | 3/1976 |
| GB | 2117813 | 10/1983 |
| GB | 2126106 | 3/1984 |
| GB | 2152063 | 7/1985 |
| GB | 2238660 | 6/1991 |
| GB | 2243381 | 10/1991 |
| GB | 2256023 | 11/1992 |
| JP | 54-65528 | 5/1979 |
| JP | 57-119056 | 7/1982 |
| JP | 59-186336 | 10/1984 |
| JP | 3-169967 | 7/1991 |
| JP | 4-106264 | 4/1992 |
| JP | 5-148984 | 6/1993 |
| JP | 6-56310 | 5/1994 |
| JP | 6-146553 | 5/1994 |
| JP | 6-200611 | 7/1994 |
| JP | 6-320510 | 11/1994 |
| JP | 7-76923 | 3/1995 |
| JP | 7-180333 | 7/1995 |
| JP | 7-300979 | 11/1995 |
| JP | 7-310426 | 11/1995 |
| JP | 8-109734 | 4/1996 |
| JP | 8-270193 | 10/1996 |
| NE | 7601773 | 2/1976 |
| NO | 157871 | 2/1988 |
| NO | 305614 | 6/1999 |
| SE | 7114900-9 | 9/1974 |
| SE | 450411 | 6/1987 |
| SE | 450141 | 9/1987 |
| SE | 501014 | 10/1994 |
| SE | 501914 | 6/1995 |

| | | |
|---|---|---|
| SE | 502994 | 4/1996 |
| SE | 506254 | 11/1997 |
| SE | 509059 | 11/1998 |
| SE | 509060 | 11/1998 |
| SE | 512290 | 2/2000 |
| SE | 512313 | 2/2000 |
| SE | 0000200-6 | 8/2001 |
| SU | 363795 | 12/1972 |
| WO | 84/02155 | 6/1984 |
| WO | 87/03839 | 7/1987 |
| WO | 89/08539 | 9/1989 |
| WO | 92/17657 | 10/1992 |
| WO | 93/13280 | 7/1993 |
| WO | 93/19910 | 10/1993 |
| WO | 94/01628 | 1/1994 |
| WO | 94/26999 | 11/1994 |
| WO | 94126999 | 11/1994 |
| WO | 95/06176 | 3/1995 |
| WO | 96/27719 | 9/1996 |
| WO | 96/27721 | 9/1996 |
| WO | 96/30177 | 10/1996 |
| WO | 97/47834 | 12/1997 |
| WO | 98/24495 | 6/1998 |
| WO | 98/24994 | 6/1998 |
| WO | 98/38401 | 9/1998 |
| WO | 99/40273 | 8/1999 |
| WO | 99/66151 | 12/1999 |
| WO | 99/66152 | 12/1999 |
| WO | 00/06854 | 2/2000 |
| WO | 00/66856 | 11/2000 |
| WO | 01/66876 | 9/2001 |

OTHER PUBLICATIONS

Webster Dictionary, p. 862.

Opposition II EPO. 698. 162—Facts—Arguments Evidence (11 pages)—translation.

*U.S. Court of Appeals for the Federal Circuit, 02-1222-1291 Alloc, Inc.* vs. *International Trade Commission*, pp. 1-32.

*U.S. Court of Appeals for the Federal Circuit Decision in Alloc, Inc.* et al. vs. *International Trade Commission and Pergs, Inc.* et al. decided Sep. 10, 2003.

* cited by examiner

METHOD FOR BRINGING IN A STRIP FORMING A SPRING OF A BOARD

FIELD OF THE INVENTION

The invention is directed to a method for placing a locking element that forms the spring of a board that is provided with a spring/groove profiling, in particular, a floor panel into a first groove that is present on one of the lateral edges of the board. The strip displays locking means with whose help two boards, connected via the spring/groove, can be locked together laterally with respect to the direction of connection.

BACKGROUND DESCRIPTION

DE 100 34 409 A1 discloses structural panels especially floor panels with a core consisting of wooden material that on at least two mutually opposite lateral edges are provided with grooves extending over their complete longitudinal side and/or lateral side. The first groove and the opposite second groove of the panel are shaped in a symmetrical mirror-image manner. The connecting element is provided with barbs. The connecting element is inserted into one of the grooves on the working side. It then fashions the spring of the panel. To connect two panels, the spring of one panel is inserted into the groove of the other panel. By means of barbs on the locking element, the two boards are then locked together laterally with respect to the direction of connection. Such boards are basically known as click panels. In that way, one can lay floor panels that float together without any glue. It is also known that one can mill the spring of the panel out of the core material.

SUMMARY OF THE INVENTION

The invention is directed to a method by means of which the locking element can, by machine, be inserted into the first groove of the board.

The following steps using the initially mentioned parts solve this problem:

a) the board and the locking element are transported at the same speed parallel to each other along a transport distance in a transport direction T, b) during transport, the locking element runs laterally along a fixed device that constantly narrows the transport distance in the direction of transport T, c) by means of the device, the locking element is constantly and increasingly shifted laterally with respect to the direction of transport T until, in the process, d) starting with its front end with respect to the direction of transport T, it is pressed into the groove of the board in a steadily increasing manner.

The invention-based steps make it possible to insert the locking elements along a production assembly line with a high cyclic rate. The two parts cannot be shifted relatively with respect to each other because the board and the locking element are transported at the same speed so that the locking element is securely and reproducibly pressed into the predetermined position in the groove in the board.

Preferably, the board is transported by at least one belt driven in a circulating manner on which are arranged mutually spaced catches in the direction of transport T and where, in each case, one catch grasps both the board and the locking element.

This design makes it possible to store the boards in a magazine in order to pass them to the belt individually, where the catch then bumps into the reverse side of the board and transports the latter forward.

A plurality of catches are preferably arranged on the belt laterally with respect to the direction of transport so that there will be a secure guidance of the board along its longitudinal side when the locking element is brought into the lateral side of the board.

The board can also be transported by several belts that are arranged parallel with respect to each other and that are driven in a circulating manner, whereby, in that case, on each belt in the direction of transport T, there are arranged mutually spaced catches and where, in each case, one catch, now on only one belt, transports both the board and the strip. In that case, the individual belts are driven in a synchronous fashion and that the catches of the individual belts also circulate, parallel to each other, in a manner laterally with respect to the direction of transport to prevent the board from being positioned obliquely during transport.

The catch preferably first grasps the board and then the locking element.

The device via which the locking element is pressed into the groove includes a rail extending in the direction of transport T with a groove that opens up in the direction of the lateral edge of the board, whereby the groove bottom of the groove extends obliquely in the direction of the groove opening. With the help of this design, the locking element is positioned obliquely in the direction of transport T and, starting at its front end, it is constantly pressed into the groove of the board.

The locking element preferably is grasped by a projection fashioned with the catch, which projection dips into the groove of the rail. On its wide side, the groove corresponds to the thickness of the locking element so that the locking element will be in a situation of forced guidance.

This forced guidance by the groove will prevent the locking element from becoming corrugated or warped.

BRIEF DESCRIPTION OF THE DRAWINGS

The invention will be explained briefly below with reference to the following drawings.

DETAILED DESCRIPTION OF EMBODIMENTS OF THE INVENTION

Figure 1:
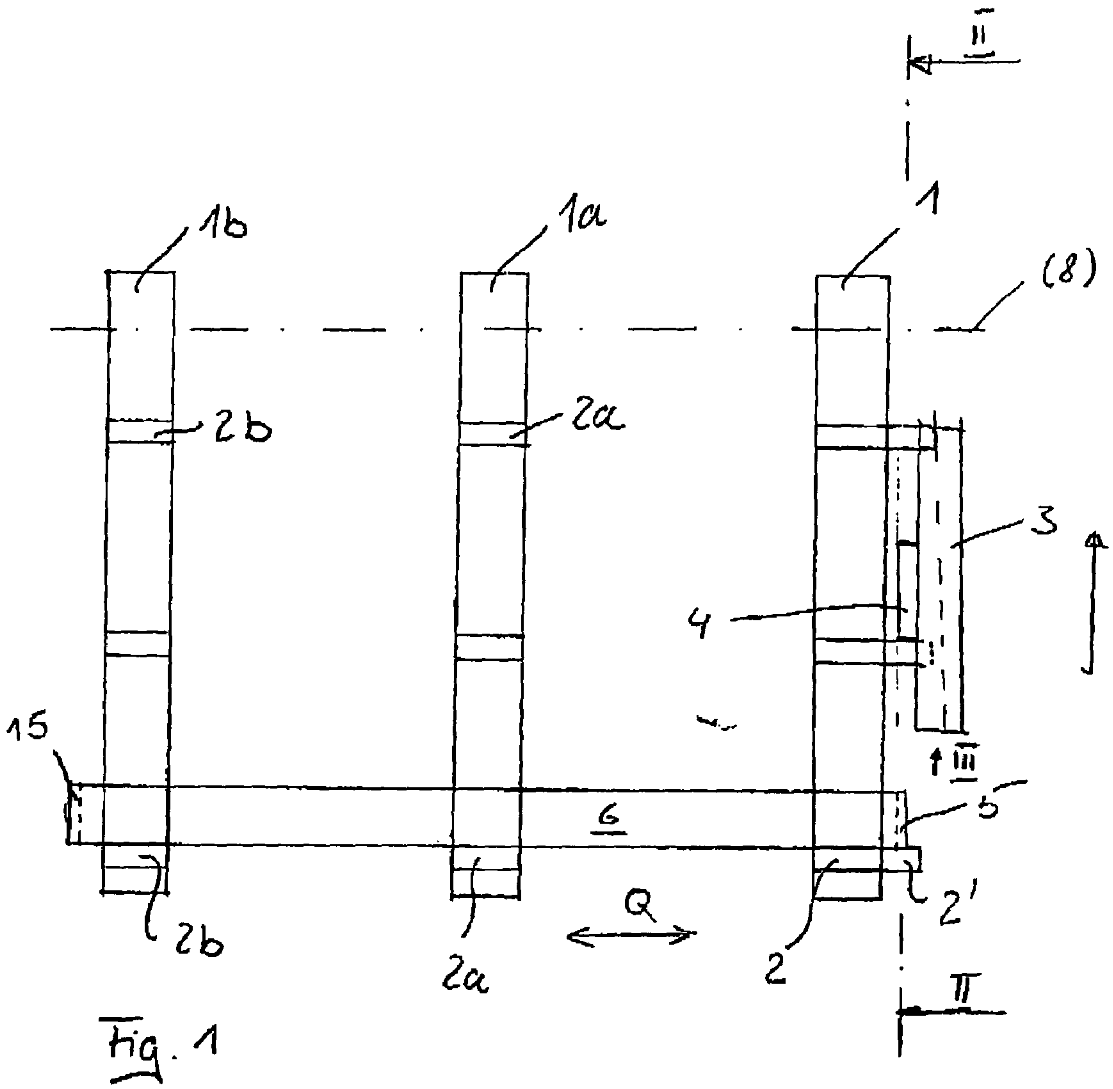
FIG. 1 is a diagram illustrating a top view of a conveyance device by means of which the method can be implemented.
Figure 2:
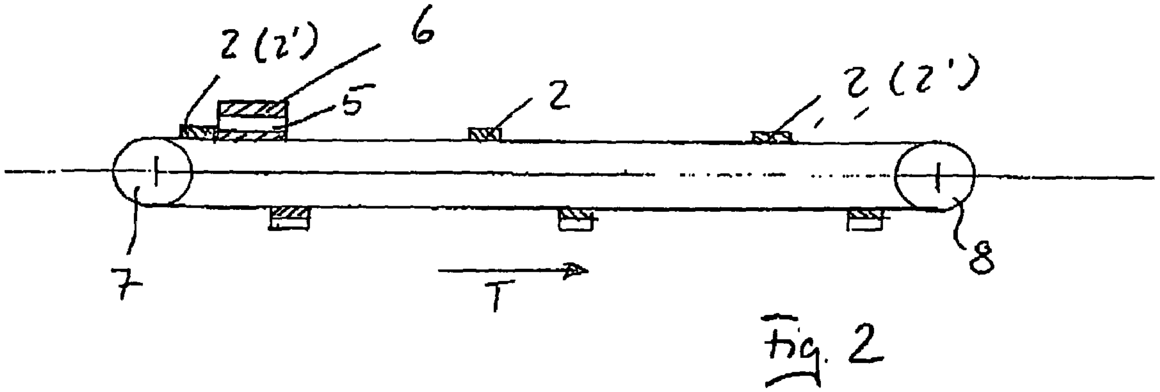
FIG. 2 shows the profile along line II-II according to FIG. 1.
Figure 3:
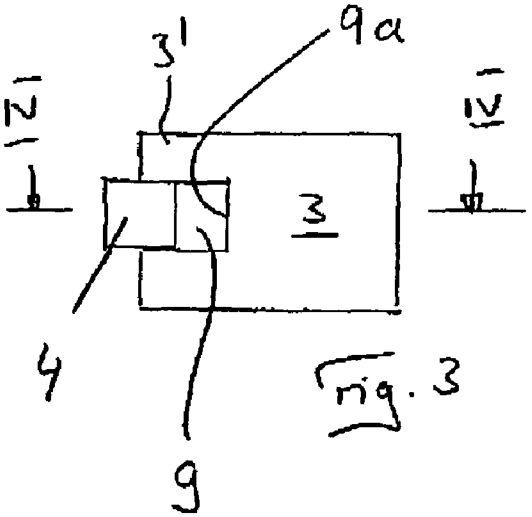
FIG. 3 is a view of the impressing device according to visual arrow according to FIG. 1.
Figure 4:
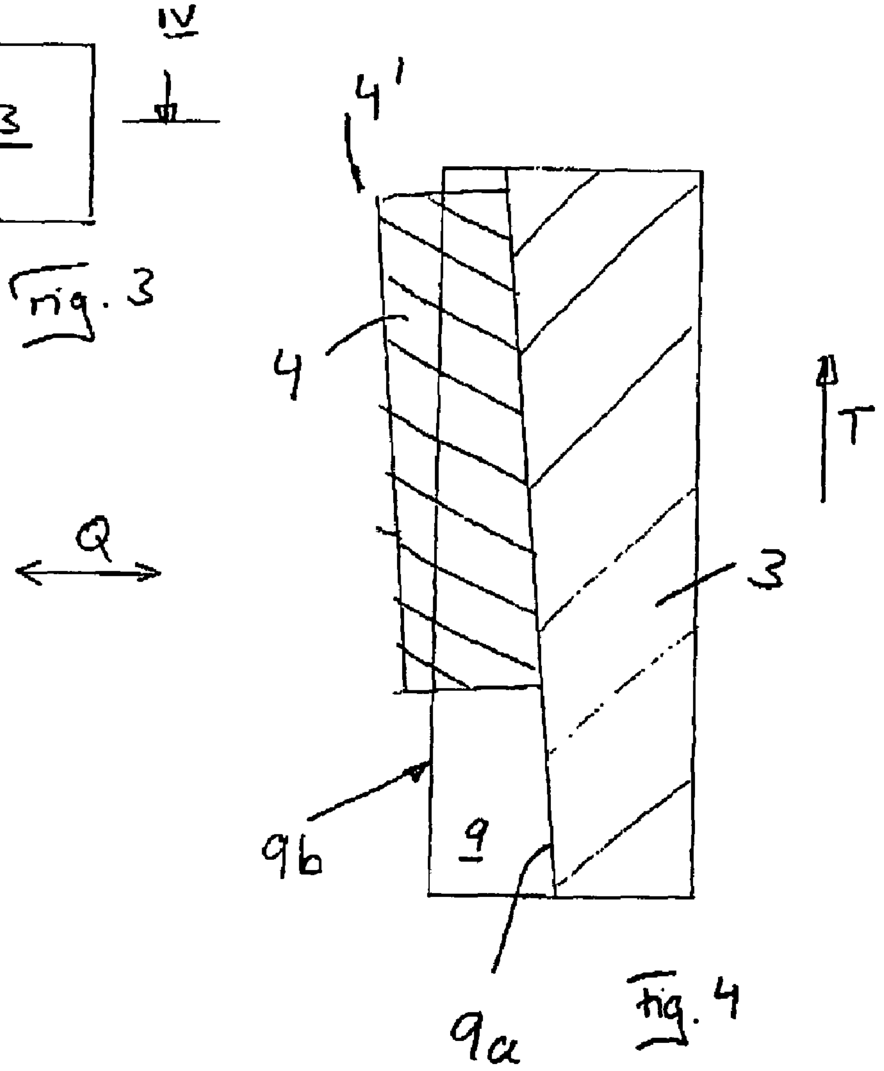
FIG. 4 shows the profile along line IV-IV according to FIG. 3.

The transport device includes three belts 1, 1*a*, 1*b* that are arranged parallel to each other and that are driven in a manner circulating around deflection rollers 7, 8. Catches 2, 2*a*, 2*b* are arranged at regular intervals on the belts 1, 1*a*, 1*b* in the direction of transport T. The catches 2, 2*a*, 2*b* protrude over the conveyor belts 1, 1*a*, 1*b* in the vertical direction and are aligned parallel to each other in lateral direction Q. The catches 2, 2*a*, 2*b* engage the rear longitudinal edge of a board 6 and thus entrain the board 6 in the direction of transport T.

A device, which includes a rail 3, is arranged in the transport distance laterally with respect to conveyor belt 1. This device has a groove 9 that opens up in the direction of the belt 1. When the board 6 is moved past the rail 3, the first groove 5 that is milled into the lateral edge of board 6 and the groove 9 of the rail 3 are opposite each other. The strip-shaped locking element 4 is inserted into the groove 9. The groove bottom 9*a* of the groove 3 extends obliquely in the direction of transport T so that the interval between the groove bottom 9*a* and the lateral edge of the panel 6 will constantly be reduced with respect to the direction of transport T.

The strip-shaped locking element 4 is inserted in the groove 9. The catches 2 of the belt 1 are provided with projections 2' that protrude laterally in the direction of the rail 3 and that dip into the groove 9 of the rail 3. In the process, the projections 2' grasp the strip 4 and transport it in the direction of transport T with the same speed as the board 6. By virtue of the oblique groove bottom 9*a,* the strip 4 is positioned obliquely in groove 9 over the transport distance. And, starting with its front end 4', the strip is inserted into the groove 5 of the board 6 and is constantly pressed into the groove 5 in the direction of transport T until, at the end, the strip 4 has been completely inserted into the groove 5.

On its mutually opposite edges, the board 6 is provided with identically shaped grooves 5, 15. This configuration simplifies the production of the boards 6 and the locking element 4 can be fashioned symmetrically. As a result, it is possible to reduce the tool costs.

The locking element 4 can be supplied as belt material from the roll and can be cut to proper length by the device 3 and can then be pushed into the groove 4 with the properly fitting length. An opening can be provided in the upper lip 3' of groove 9 for this purpose.

The invention claimed is:

1. A method for placing a locking element that forms a spring of a board that is provided with a spring/groove profiling in a first groove that is present on a lateral edge of the board, wherein via the locking element two boards connected via the spring/groove profiling can be locked together laterally with respect to a direction of connection, comprising:

transporting the board and the locking element at a same speed parallel to each other along a transport distance in a transport direction (T), wherein during the transporting, the locking element runs laterally along a fixed device that narrows the transport distance in the direction of transport (T), the fixed device constantly and increasingly shifts the locking element laterally with respect to the direction of transport (T) until, in the process, starting with a front end of the locking element with respect to the direction of transport (T), the locking element is pressed into the groove in a steadily increasing manner.

2. The method according to claim 1, wherein the board is transported by at least one belt that is driven in a circulating manner on which catches are arranged in the direction of transport (T), spaced apart from each other, and where, in each case, one catch grasps both the board and the locking element.

3. The method according to claim 2, wherein the catches are a plurality of catches arranged on the at least one belt laterally with respect to the direction of transport (T).

4. The method according to claim 2, wherein one of the catches first grasps the board and then the locking element.

5. The method according to claim 2, wherein the at least one belt include three belts that are arranged parallel to each other and that are driven in a manner circulating around deflection rollers.

6. The method according to claim 5, further comprising catches arranged at regular intervals on the belts in the direction of transport and protrude over the belts in a vertical direction and are aligned parallel to each other in a lateral direction, the catches engage a rear longitudinal edge of the board with respect to the direction of transport and entrain the board in the direction of transport.

7. The method according to claim 5, wherein the catches are provided with projections which grasp the locking element and transport it in the direction of transport with the same speed as the board.

8. The method according to claim 2, further comprising:

storing a plurality of boards in a magazine; and passing the board from the plurality of boards in the magazine to the at least one belt, wherein the one catch bumps into a rear side of the board with respect to the direction of transport.

9. The method according to claim 2, further comprising inserting the locking element into a groove of the fixed device before the one catch grasps the locking element.

10. The method according to claim 1, wherein the board is transported by several belts arranged in parallel, which are driven in a circulating manner and on each of the several belts in the direction of transport are arranged mutually spaced catches where one catch on one of the several belts transports both the board and the locking element.

11. The method according to claim 10, wherein the catch first grasps the board and then the locking element.

12. The method according to claim 1, wherein the fixed device comprises a rail, extending in the direction of transport (T), with a groove that opens up in a direction of the lateral edge of the board, and a groove bottom of the groove extends obliquely in a direction of opening of the groove.

13. The method according to claim 12, wherein the locking element is grasped by a projection that is formed with a catch, which projection dips into the groove of the rail.

14. The method according to claim 12, wherein the locking element is grasped by a projection that is formed with a catch, which projection dips into the groove of the rail.

15. The method according to claim 1, wherein the locking element is made of plastic material.

16. A method for placing a locking element in a groove of a board, the board being provided with a spring/groove profiling, wherein two boards connected via the spring/groove profiling are locked laterally by the locking element, the method comprising:

inserting the locking element into a groove of a fixed device;

first grasping the board and then grasping the locking element inserted in the groove of the fixed device with a catch arranged on a belt; and transporting the board and the locking element at a same speed parallel to each other along a transport direction, wherein the groove of the fixed device narrows along the transport direction such that during the transporting the locking element is pressed into the groove of the board in a steadily increasing manner starting with a front end of the locking element with respect to the direction of transport, the catch is arranged in a vertical direction on the belt with respect to the direction of transport, and the fixed device is arranged in a lateral direction relative to the belt with respect to the direction of transport, the lateral direction being different than the vertical direction.

17. The method of claim 16, wherein:

the belt is driven in a circulating manner, another belt having another catch arranged thereon is driven in a circulating manner parallel to the belt, and the other catch is aligned parallel to the catch laterally with respect to the direction of transport, such that during the transporting the catch and the other catch engage a rear longitudinal edge of the board with respect to the direction of transport to prevent the board from being positioned obliquely during the transporting.

18. The method of claim 17, wherein:

the catch includes a projection that dips into the groove of the fixed device such that during the transporting the catch grasps both the board and the locking element, and the other catch grasps the board without grasping the locking element.

19. The method of claim 16, further comprising:

storing the board with a plurality of boards in a magazine; and passing the board from the magazine to the belt, wherein the catch bumps into a rear side of the board with respect to the direction of transport.

20. The method of claim 16, further comprising cutting the locking element from a roll, wherein the inserting comprises pushing the cut locking element into the groove of the fixed device.

* * * * *